July 3, 1962
R. K. COATES ETAL
3,042,295
COMPUTER
Filed April 20, 1961
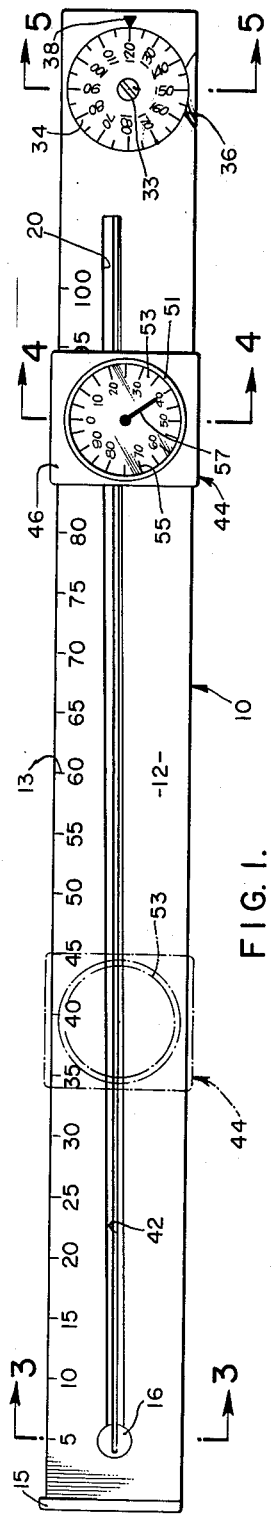
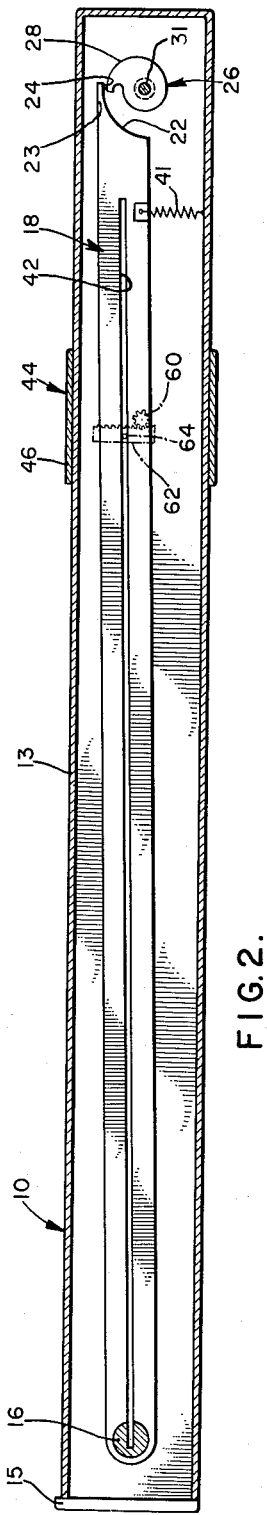
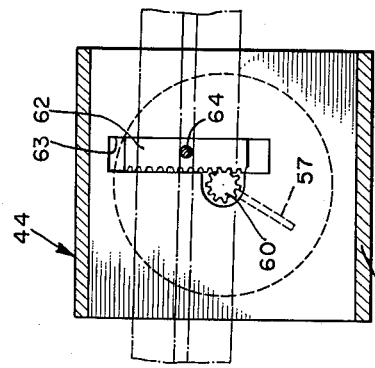
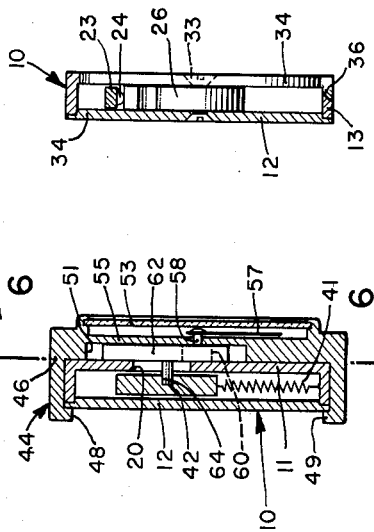
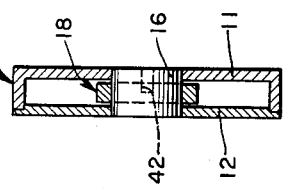
ROY K. COATES
CHARLES D. HOWARD
INVENTORS.
BY *Edward C. Walsh*
ATTORNEY.

United States Patent Office 3,042,295
Patented July 3, 1962

3,042,295
COMPUTER
Roy K. Coates, 9342 Glenoaks Blvd., Sun Valley, Calif., and Charles D. Howard, Van Nuys, Calif. (9342 Glenoaks Blvd., Sun Valley, Calif.)
Filed Apr. 20, 1961, Ser. No. 104,292
2 Claims. (Cl. 235—61)

This invention relates to a novel and simplified computer or calculator device. The calculator is a simplified one for calculating and giving an indication which is a function of two variables.

The invention is described herein representatively and by way of example as an aircraft computer for quickly computing and indicating the time of flight between two points. It is to be expressly understood that the embodiment of the invention disclosed herein is exemplary of an adaptation of it and that the invention is readily adaptable to other types of computing. The invention is adaptable to any requirement of computing and giving an indication which is the function of two variables.

The invention fulfills a very particular need with respect to aircraft navigation since it provides an extremely simple and effective device for computing the time of flight between two points merely by making a ground speed setting and moving a slider. The computation is made with a single device or piece of equipment and with only one setting and one movement of a sliding member.

In a preferred form of the invention, it is characterized by an elongated bar or member graduated in miles corresponding to mile indications on a navigational or piloting chart. The elongated member carries a movable indicating device resembling a cursor on a slide rule. The movable member carries an indicating dial and pointer for directly indicating the flying time in minutes in the representative embodiment of the invention disclosed in detail herein.

The second elongated bar is pivoted to the first and may be adjusted to a predetermined angular position relative thereto, this angle being set to correspond to and being representative of the ground speed of the aircraft which is set and indicated by means of a dial.

Driving means are provided for the rotatable pointer carried by the cursor or movable member so that the indication of this pointer is a function of the linear movement of the movable means or cursor and also of the relative angular position of the other elongated member. As stated, in the embodiment of the invention disclosed herein, the indicator on the movable member or cursor directly indicates flying time in minutes.

Particular novel and effective means are provided for driving the rotatable pointer carried by the movable member. These driving means constitute a new and improved mechanical movement. In a preferred form of the invention, as described in detail hereinafter, this mechanical movement is in the form of a rack mounted to slide transversely as respects the cursor or movable member in an amount proportional to the angular setting of the second elongated member and a pinion gear driven by the rack and on the shaft of the indicating pointer.

From the foregoing, the primary objects of the invention will be apparent to those skilled in the art. They include the making available of a simplified computer or calculator for calculating and giving an indication which is a function of two variables.

Another object is to provide an improved calculator as in the foregoing particularly adapted for directly calculating and indicating time of flight of an aircraft or the like between two points.

Another object is to provide a calculator as in the foregoing wherein an indication is given which is a function of linear movement of a slidable member and of the angular displacement between two members pivoted together.

Another object is to provide a calculator as in the foregoing including a first elongated member graduated in miles, a dial graduated in miles per hour of ground speed for setting the angle between the members, and a dial and pointer for indicating directly time of flight in minutes.

Further objects and advantages of the invention will become apparent from the following detailed description, claims and annexed drawings wherein:

FIG. 1 is a plan view of a preferred form of the invention;
FIG. 2 is a sectional view of the form of the invention shown in FIG. 1;
FIG. 3 is a sectional view taken along the line 3—3 of FIG. 1;
FIG. 4 is a sectional view taken along the line 4—4 of FIG. 1;
FIG. 5 is a sectional view taken along the line 5—5 of FIG. 1;
FIG. 6 is a sectional view taken along the line 6—6 of FIG. 4.

Referring now more in detail to the various figures of the drawings, numeral 10 designates generally an elongated housing including a member 11 of channel shaped cross-section as shown in FIG. 3 and a face or cover plate member 12. The member 12 is graduated in miles along one edge as designated at 13 corresponding to the mile indications or designations on a navigational chart or map. At one end of the plate 12 is a rib 15 forming an index or index point for the scale on the member 12.

Numeral 16 designates a circular post at one end of the device extending between the bottom of channel member 11 and plate 12. Pivotally mounted on this post is an elongated member or sine bar designated by the numeral 18. The sine bar is within the housing 10 and it is opposite an elongated angular slot 20 in the face plate 12. The end of the elongated member 18 has an arcuate part or cut-out 22 forming an extending finger 23 on which is a button 24. This button rides against the surface of a cam 26 having a rising cam rise surface as designated at 28. The cam 26 is on a shaft or stem 31 journalled in the bottom of channel member 11 and the cover plate 12. On this stem and held by an adjusting screw 33 is a dial 34 set into a circular cut-out in the plate 12 so that it is flush therewith. Numeral 36 designates an arcuate cut-out in an edge of the plate 12 and in the channel member 11 to accommodate an operator's thumb for engaging an edge of the dial 34 and adjusting it. The dial 34 is graduated from 70 to 180 representing ground speed in miles per hour and this dial operates adjacent to an index marker 38 on the plate 12.

Numeral 41 designates a coil spring normally urging the elongated member 18 against the cam 26 so that the end of member 18 closely follows the surface of the cam as the cam is adjusted. Other biasing means might be used such as, for example, a generally U-shaped biasing spring might be used with one leg engaging the extending finger 23 of the member or bar 18 and the other leg of the U engaging a fixed abutment.

The elongated member or bar 18 has a relatively narrow elongated slot 42 in it which is parallel to the side edges of this bar.

The angular position of dial 34 may be adjusted on its stem relative to the position of cam 26 by loosening and retightening the screw 33 as will be referred to again hereinafter.

Numeral 44 designates generally a slider which slides linearly or longitudinally on the housing 10 and it generally resembles a cursor on a slide rule. The cursor or slider comprises a frame as designated at 46 in FIG. 4 which forms a channel to engage the housing 10 there being side legs or parts as shown having inwardly extending flanges or lugs 48 and 49 fitting over the edges of the face plate 12. The frame 46 has an extending boss 51 forming a bezel in which is fitted a glass face or plate 53 which is over a graduated circular dial 55. This dial is graduated from 0 to 90 and is representative of minutes of flight time. Numeral 57 designates a rotatable pointer on a stem 58. This pointer rotates with respect to the graduated dial 55. On the stem 58 is a driving pinion gear 60. The pinion gear 60 is driven by a movable rack 62 which is slideable transversely in a transverse channel 63 formed in the frame part 46 of the movable member or cursor 44. The channel 63 is adjacent to the pinion gear 60 so that the teeth of the rack 62 when in the channel mesh with the pinion gear 60. The rack 62 has an extending pin 64 which extends through the elongated slot 20 in the plate 12 and engages in the elongated slot 42 in the elongated member or sine bar 18.

From the foregoing, it will be understood that as the slider or cursor is moved linearly along the housing 10, by reason of the pin 64 of rack 62 engaging in the angularly disposed slot 42 the rack 62 will be caused to move transversely in the channel 63. This movement will cause the pinion gear 60 to be driven and the pointer 57 will be rotated correspondingly with respect to the dial 55.

From the foregoing, the operation and utilization of the invention will be readily apparent to those skilled in the art. Broadly, it will be observed that whenever the cursor 44 is moved the indication given by the pointer 57 will be a function of two variables, namely, the angular setting of bar 18 and the amount of linear movement of the cursor. In other words, the single movement of the slider 44 calculates a result which is a function of the two variables. The result is directly indicated on the indicating dial on the slider. It will be observed that the amount of rotation imparted to the pinion gear 60 depends upon the amount of linear movement of the slider 44 but additionally, depends upon the relative angular position of the bar 18 since the greater this angle is the greater is the movement that is imparted to the rack 62 for a given linear movement of the slider 44.

The device is used as an aircraft computer in the following manner. First, the pilot will determine his ground speed. He does this by flying between two points which are a known distance apart on the chart and checking his flying time in minutes with his watch. The cursor is set to the mile indication on the scale 13 corresponding to the distance between the two points. With the cursor so set the pilot then adjusts the dial 34 until the pointer 57 reads the number of minutes that he timed with his watch. The reading of dial 34 opposite index 38 is then the ground speed. The pilot then simply slides the cursor 44 to any miles indication on the scale 13 and the pointer on the cursor will indicate the number of minutes of flying time to that point. The upper left hand corner of the face of the cursor forms an index cooperable with the scale 13. It will be observed that the flying time in minutes to any point any number of miles away is immediately read simply by sliding the cursor 44 to that mile indication. The computer or instrument is small, compact and unitary and requires only the movements described.

The device may be calibrated to give accurate readings of flying time in minutes by adjusting the dial 34 relative to the cam 26 in the manner previously described. Conversely, this calibration will result in a correct reading of ground speed being given when the ground speed is determined by the device in the manner described above.

As those skilled in the art will observe, the shape of cam 26 is so made that the variation in slope imparted to the slot 42 is adjusted so that the time in minutes indicated is directly proportional to the miles on scale 13 and inversely proportional to the ground speed set on dial 34.

From the foregoing it will be observed that the invention achieves and realizes the objects and advantages specifically outlined in the foregoing as well as all those that are apparent from the detailed description. The device utilizes an original and simplified movement. The device is unitary and requires only the simplest of movements. It is positive and accurate and adaptable to many other utilizations. The disclosure herein is representative of a preferred form of the invention and is to be interpreted in an illustrative rather than a limiting sense. The invention may be used to compute or calculate results based on variables other than the specific variables discussed herein. It is intended that the invention cover and embrace other equivalent means of giving an indication which is a function of the linear movement of a movable means and also of the angle between two members. The invention is to be given the full scope of the claims appended hereto.

What is claimed is:

1. A computing device comprising an elongated hollow bar having an elongated inclined slot in a side thereof, an elongated member within the bar having a longitudinal slot in it, the said member being pivoted at one end thereof adjacent one end of the bar, a rotatable cam within the hollow bar adjacent the other end thereof and engageable with the other end of said elongated member for adjusting its position, a single cursor mounted to slide longitudinally on said hollow bar, said cursor carrying a dial and a cooperating rotatable pointer, a slidably mounted rack carried by said cursor mounted to slide transversely as respects the said hollow bar, a pin carried by the rack extending through the slot in the side wall of the hollow bar and engaging in the elongated slot in the pivoted member within the hollow bar, and a pinion on the shaft of the said pointer engageable with the said rack whereby upon longitudinal movement of the cursor the rack is caused to move transversely whereby to drive the said pinion and actuate the said pointer.

2. A computing device as in claim 1 including a graduated dial mounted in a side wall of said hollow bar and a shaft driven thereby having said cam mounted thereon for making predetermined adjustments of the pivotal position of the said elongated member in the hollow bar.

References Cited in the file of this patent
UNITED STATES PATENTS

| | | |
|---|---|---|
| 732,985 | Wilson et al. | July 7, 1903 |
| 2,319,891 | Telander | May 25, 1943 |
| 2,444,549 | Anderson | July 6, 1948 |